US012177660B2

(12) United States Patent
Liu et al.

(10) Patent No.: US 12,177,660 B2
(45) Date of Patent: Dec. 24, 2024

(54) BLUETOOTH MESH NETWORK SYSTEM AND PROVISION METHOD HAVING QUICK PROVISIONING MECHANISM

(71) Applicant: REALTEK SEMICONDUCTOR CORPORATION, Hsinchu (TW)

(72) Inventors: Qi Liu, Suzhou (CN); Shi-Meng Zou, Suzhou (CN); Bin Shao, Suzhou (CN); Yang Huang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 362 days.

(21) Appl. No.: 17/192,934

(22) Filed: Mar. 5, 2021

(65) Prior Publication Data

US 2021/0289352 A1  Sep. 16, 2021

(30) Foreign Application Priority Data

Mar. 16, 2020 (CN) .......................... 202010182893.1

(51) Int. Cl.
| | | |
|---|---|---|
| *H04W 12/04* | (2021.01) | |
| *G08C 23/04* | (2006.01) | |
| *H04B 10/114* | (2013.01) | |
| *H04W 4/80* | (2018.01) | |
| *H04W 12/041* | (2021.01) | |
| *H04W 12/0431* | (2021.01) | |
| *H04W 84/18* | (2009.01) | |

(52) U.S. Cl.
CPC .......... *H04W 12/041* (2021.01); *G08C 23/04* (2013.01); *H04B 10/1143* (2013.01); *H04W 4/80* (2018.02); *H04W 12/0431* (2021.01); *H04W 84/18* (2013.01)

(58) Field of Classification Search
CPC . H04W 12/041; H04W 4/80; H04W 12/0431; H04W 84/18; G08C 23/04; G08C 17/02; H04B 10/1143
See application file for complete search history.

(56) References Cited

U.S. PATENT DOCUMENTS

| | | | |
|---|---|---|---|
| 2013/0336485 A1 | 12/2013 | Da et al. | |
| 2015/0117298 A1* | 4/2015 | Hanatani | ............... H04L 12/189 |
| | | | 370/312 |

(Continued)

FOREIGN PATENT DOCUMENTS

| | | | | |
|---|---|---|---|---|
| CN | 103491536 A | | 1/2014 | |
| CN | 112188711 A | * | 4/2019 | ............. H05B 47/19 |

OTHER PUBLICATIONS

Caesar et al, "A Location Privacy Analysis of Bluetooth Mesh" Aug. 26, 2019, ARES '19: Proceedings of the 14th International Conference on Availability, Reliability and Security, ACM ISBN 978-1-4503-7164-3/19/08 . . . pp. 1-7. (Year: 2019).*

*Primary Examiner* — Harunur Rashid
(74) *Attorney, Agent, or Firm* — WPAT, P.C

(57) ABSTRACT

The present invention discloses a Bluetooth mesh network system having quick provisioning mechanism that includes an infrared control apparatus and nodes. The infrared control apparatus generates a provisioning activation infrared signal. Each of the nodes receives the provisioning activation infrared signal and generates a group key according to predetermined group number information thereof to perform communication according to the group key based on a Bluetooth mesh network communication protocol.

11 Claims, 2 Drawing Sheets

(56) References Cited

U.S. PATENT DOCUMENTS

2017/0241354 A1\* 8/2017 Ali Khan ............... F02D 41/021
2019/0182649 A1\* 6/2019 Best ........................ H04W 4/70
2019/0349252 A1\* 11/2019 Hu ....................... H04L 41/0895
2020/0037103 A1\* 1/2020 Raji ........................ H04W 4/21

\* cited by examiner

BLUETOOTH MESH NETWORK SYSTEM AND PROVISION METHOD HAVING QUICK PROVISIONING MECHANISM

BACKGROUND OF THE INVENTION

1. Field of the Invention

The present invention relates to a Bluetooth mesh network system and a provision method having quick provisioning mechanism.

2. Description of Related Art

In Bluetooth mesh network technology, a provision process is required for an electronic device to join a Bluetooth mesh network. The provision process is complex and time-consuming. For example, the provision process may include such as, but not limited to transmission of beacon signals, invitation procedure, exchange of keys, and distribution of verification and activation data. Only after the provision process is finished, can nodes form the Bluetooth mesh network and communicate with each other based on the Bluetooth mesh network protocol.

However, in some applications, lots of nodes are presented. Under such a condition, each of the nodes has to go through the complex provision process that results in a waste of time. If there is no efficient provision process, the establishment of the Bluetooth mesh network costs a large amount of time.

SUMMARY OF THE INVENTION

In consideration of the problem of the prior art, an object of the present invention is to provide a Bluetooth mesh network system and a provision method having quick provisioning mechanism.

The present invention discloses a Bluetooth mesh network system and having quick provisioning mechanism that includes an infrared control apparatus and a plurality of nodes. The infrared control apparatus is configured to generate a provisioning activation infrared signal. Each of the nodes is configured to receive the provisioning activation infrared signal and subsequently generate a group key according to predetermined group number information thereof to perform communication according to the group key based on a Bluetooth mesh network communication protocol.

The present invention also discloses a Bluetooth mesh network system provision method having quick provisioning mechanism that includes the steps outlined below. A provisioning activation infrared signal is generated by an infrared control apparatus. The provisioning activation infrared signal is received and a group key is generated subsequently by each of a plurality of nodes according to predetermined group number information thereof. Communication is performed according to the group key based on a Bluetooth mesh network communication protocol by the nodes.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a Bluetooth mesh network system and a provision method having quick provisioning mechanism to use infrared signal to activate the nodes, such that the nodes generate a group key according to the predetermined group number information. The nodes that have the same group key can thus form a Bluetooth mesh network to perform communication according to the group key to finish the provision process quickly.

Figure 1:
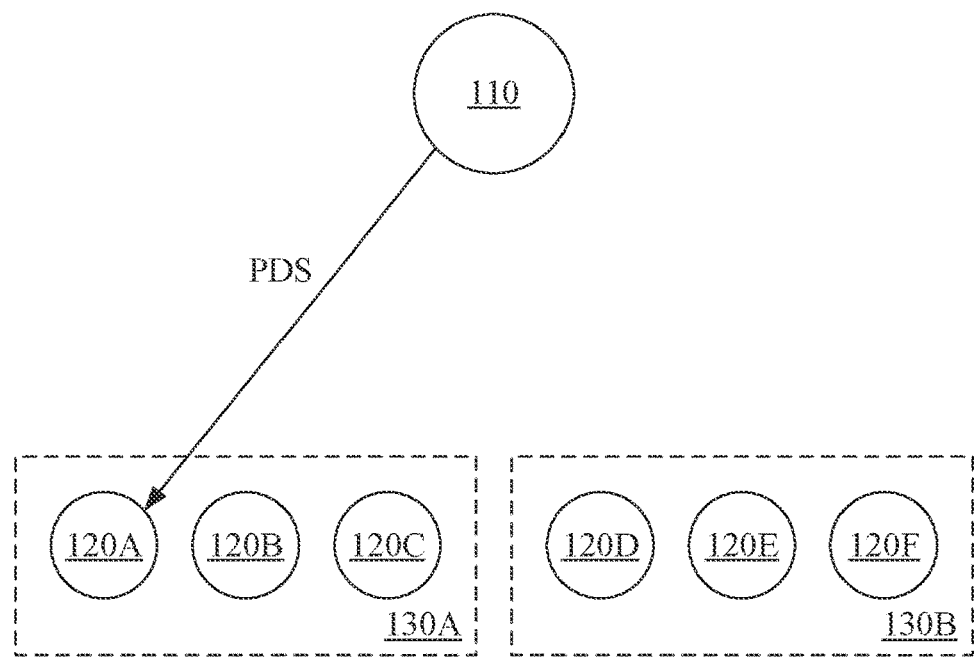
FIG. 1 illustrates a diagram of a Bluetooth mesh network system having quick provisioning mechanism according to an embodiment of the present invention.

Reference is now made to FIG. 1. FIG. 1 illustrates a diagram of a Bluetooth mesh network system 100 having quick provisioning mechanism according to an embodiment of the present invention. The Bluetooth mesh network system 100 includes an infrared control apparatus 110 and a plurality of nodes 120A-120F.

The infrared control apparatus 110 can be such as, but not limited to an infrared remote controller capable of receiving and delivering infrared signals, or other wireless devices. The infrared control apparatus 110 is configured to generate a provisioning activation infrared signal PDS.

In an embodiment, each of the nodes 120A-120F included in the Bluetooth mesh network system 100 can be a provisioner node, a relay node, a friend node, a lower power node (LPN) or a combination thereof (not illustrated) defined in Bluetooth mesh network protocol.

Each of the nodes 120A-120F is configured to receive the provisioning activation infrared signal PDS and subsequently generate a group key GKEY according to predetermined group number information thereof, to perform communication according to the group key GKEY based on a Bluetooth mesh network communication protocol. It is appreciated that in FIG. 1, only the provisioning activation infrared signal PDS between the infrared control apparatus 110 and the node 120A is illustrated. In actual implementation, each of the nodes 120A-120F can receive the provisioning activation infrared signal PDS from the infrared control apparatus 110.

The configuration and the operation of the nodes 120A-120F are further described in detail in the following paragraphs by using the node 120A as an example.

Figure 2:
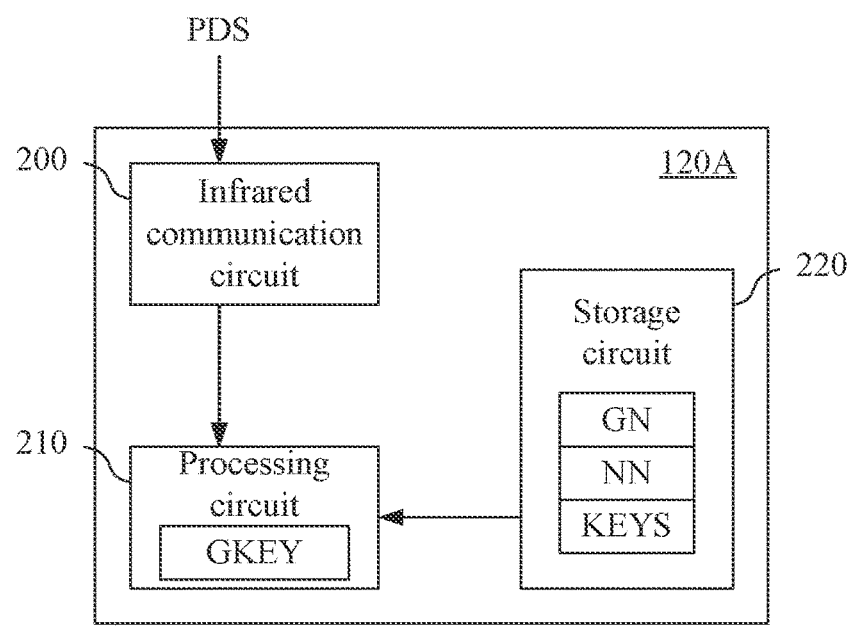
FIG. 2 illustrates a block diagram of the node according to an embodiment of the present invention.

Reference is now made to FIG. 2. FIG. 2 illustrates a block diagram of the node 120A according to an embodiment of the present invention. The node 120A includes an infrared communication circuit 200, a processing circuit 210 and a storage circuit 220.

The infrared communication circuit 200 is configured to receive and deliver infrared signals. As a result, the infrared communication circuit 200 can receive the provisioning activation infrared signal PDS.

According to the reception and activation of the provisioning activation infrared signal PDS, the processing circuit 210 subsequently generates the group key GKEY according to predetermined group number information thereof.

In an embodiment, each of the nodes 120A-120F has predetermined group number information GN and node number information NN.

For example, the nodes 120A-120F can be lighting fixtures disposed in different groups in different floors of different buildings. As a result, the predetermined group number information GN may include a building number, a floor number and a group number.

The node number information NN may include an individual lighting fixture number within each of the groups. In an embodiment, the building number, the floor number and the group number can be identified by using one byte, and the lighting fixture number can be identified by using two bytes. However, the present invention is not limited thereto.

In an embodiment, the predetermined group number information GN and the node number information NN can be configured manually by using such as, but not limited to a configuration circuit disposed on the nodes 120A-120F. The processing circuit 210 can retrieve the configuration of the configuration circuit when the nodes 120A-120F are in an initialization status. In another embodiment, the predetermined group number information GN and the node number information NN can be stored in storage circuit 220 in advance, as illustrated in FIG. 1. The processing circuit 210 can read the information from the storage circuit when the nodes 120A~120F are in an initialization status.

In an embodiment, the storage circuit 220 is further configured to store a plurality of pre-stored keys KEYS. After the processing circuit 210 receives the provisioning activation infrared signal PDS, the processing circuit 210 retrieves one of the pre-stored keys KEYS as the group key GKEY according to the predetermined group number information GN.

In another embodiment, after the processing circuit 210 receives the provisioning activation infrared signal PDS, the processing circuit executes a predetermined calculation program according to the predetermined group number information GN to generate the group key GKEY. The predetermined calculation program can also be pre-stored in the storage circuit 220, and be retrieved by the processing circuit 210 to perform calculation accordingly.

In an embodiment, the group key GKEY may include a network communication key and an application program key. The network communication key is used by the nodes 120A-120F to identify each other during the transmission of the packets. The application program key corresponds to an application program related to a command to be executed that is received by the nodes 120A-120F.

As a result, by using the method described above, the nodes 120A-120F can form the Bluetooth mesh network within a group that the nodes belong, in which different groups can be identified by the group key GKEY generated by the processing circuit 210. The nodes 120A-120F within the group can thus perform communication with each other according to the group key GKEY.

For example, in the nodes 120A-120F, the nodes 120A-120C belong to the same group (e.g. having the same building number, the same floor number and the same group number) to form a first Bluetooth mesh network 130A. As a result, the nodes 120A-120C perform communication based on the Bluetooth mesh network communication protocol according to the same group key. The nodes 120D-120F belong to another group to form a second Bluetooth mesh network 130B. As a result, the nodes 120D-120F perform communication based on the Bluetooth mesh network communication protocol according to the same group key.

Figure 3:
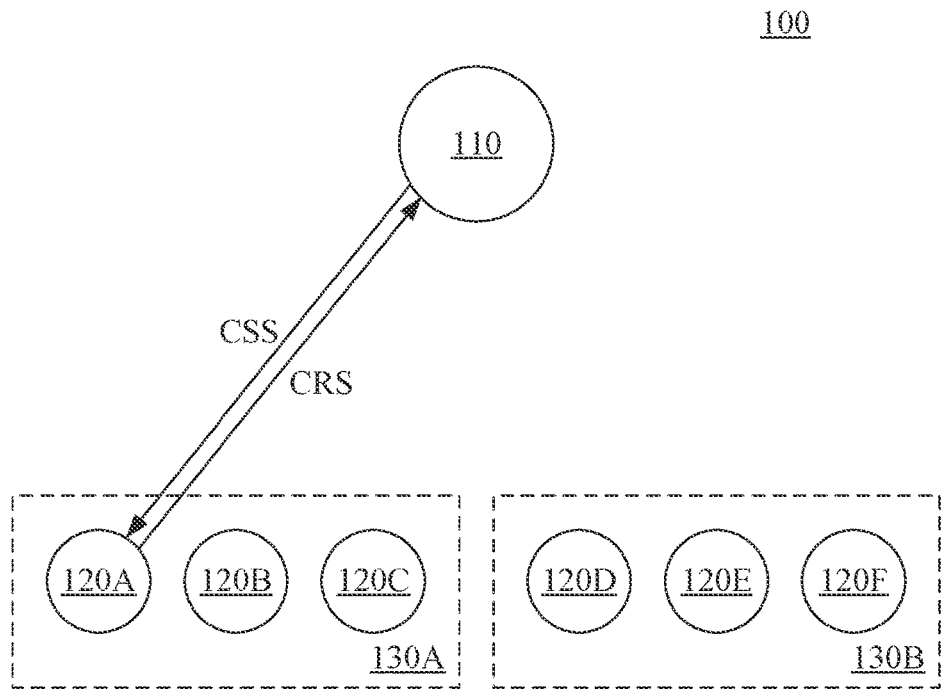
FIG. 3 illustrates a diagram of the Bluetooth mesh network system according to an embodiment of the present invention.

Reference is now made to FIG. 3. FIG. 3 is a diagram of the Bluetooth mesh network system 100 according to an embodiment of the present invention. Identical to the system illustrated in FIG. 1, the Bluetooth mesh network system 100 in FIG. 3 includes the infrared control apparatus 110 and the nodes 120A-120F.

In an embodiment, the infrared control apparatus 110 is further configured to generate an infrared control signal CSS that includes the predetermined group number information GN and the node number information NN. The nodes 120A-120F, corresponding to the predetermined group number information and the node number information, execute a corresponding command according to the infrared control signal CCS. By using such a method, the nodes 120A-120F can perform corresponding function test according to the infrared control apparatus 110, after the establishment of the Bluetooth mesh network is finished.

In an embodiment, each of the nodes 120D-120F is configured to generate an infrared status report signal CRS that includes the predetermined group number information GN and the node number information NN, such that the infrared control apparatus 110 retrieves status information of each of the nodes 120D-120 from the infrared status report signal CRS.

In an embodiment, the nodes 120D-120F can control the infrared communication circuit 200 to generate the infrared status report signal CRS by using such as, but not limited to the processing circuit 210, according to the predetermined group number information GN and the node number information NN. When the infrared control apparatus 110 is implemented by such as a router equipped with infrared transmission function, the infrared control apparatus 110 can report the status information of the nodes 120D-120F to an external network device, to perform subsequent analysis or processing.

It is appreciated that in FIG. 3, only the infrared control signal CSS and the infrared status report signal CRS between the infrared control apparatus 110 and the node 120A are illustrated. In actual implementation, each of the nodes 120A-120F can receive the infrared control signal CSS from the infrared control apparatus 110, and transmit the infrared status report signal CRS to the infrared control apparatus 110.

In some approaches, for each of the nodes in the Bluetooth mesh network system, a thorough provision process that includes such as, but not limited to transmission of beacon signals, invitation procedure, exchange of keys, and distribution of verification and activation data. Only after the provision process is finished, can nodes form the Bluetooth mesh network. Such a procedure is time-consuming and is not efficient when the amount of the nodes is huge.

The Bluetooth mesh network system uses infrared signal to activate the nodes, such that the nodes generate a group key according to the predetermined group number information. The nodes that have the same group key can thus form a Bluetooth mesh network to perform communication according to the group key to finish the provision process quickly.

After the Bluetooth mesh network is established, the nodes can communicate with each other under the Bluetooth mesh network protocol and execute related application programs. For example, when the nodes are implemented by lighting fixtures, one of the nodes can turn on the light once an event of human arrival is detected. The node can further inform other nodes to turn on the light as well. When the nodes malfunction, a malfunction information can be delivered to an external cloud device under the Bluetooth mesh network protocol. A subsequent maintenance process can be performed.

It is appreciated that the number of nodes and the groups formed by the nodes are merely an example. In other embodiments, the number of nodes and the groups can be any number that is one or larger than one.

Figure 4:
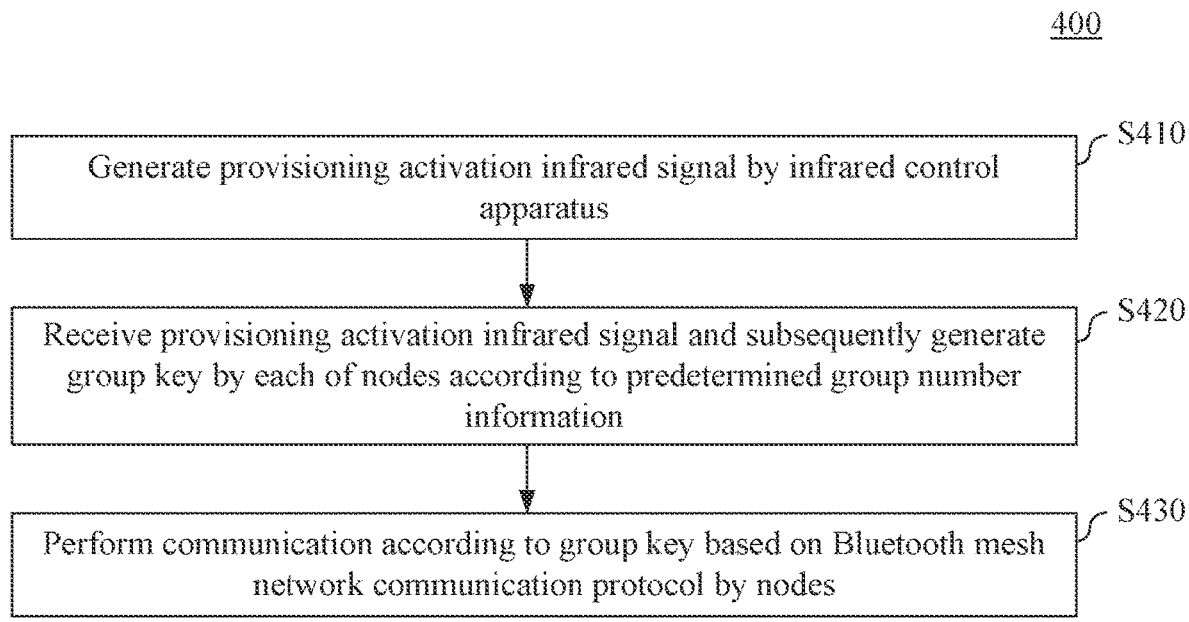
FIG. 4 illustrates a flow chart of a Bluetooth mesh network system provision method according to an embodiment of the present invention.

Reference is now made to FIG. 4. FIG. 4 illustrates a flow chart of a Bluetooth mesh network system provision method 400 according to an embodiment of the present invention.

Besides the apparatus described above, the present invention further discloses the Bluetooth mesh network system provision method 400 that can be used in such as, but not limited to the Bluetooth mesh network system 100 illustrated in FIG. 1. An embodiment of the Bluetooth mesh network system provision method 400 is illustrated in FIG. 4 and includes the steps outlined below.

In step S410, the provisioning activation infrared signal PDS is generated by the infrared control apparatus 110.

In step S420, the provisioning activation infrared signal PDS is received and the group key GKEY is generated subsequently by each of the nodes 120A-120F according to predetermined group number information GN thereof.

In step S430, communication is performed according to the group key GKEY based on the Bluetooth mesh network communication protocol by the nodes 120A-120F.

It is appreciated that the embodiments described above are merely an example. In other embodiments, it should be appreciated that many modifications and changes may be made by those of ordinary skill in the art without departing, from the spirit of the invention.

In summary, the Bluetooth mesh network system and the provision method having quick provisioning mechanism of the present invention can use infrared signal to activate the nodes, such that the nodes generate a group key according to the predetermined group number information. The nodes that have the same group key can thus form a Bluetooth mesh network to perform communication according to the group key to finish the provision process quickly.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A Bluetooth mesh network system having quick provisioning mechanism, the system comprising:
    an infrared control apparatus configured to generate a provisioning activation infrared signal used to activate a provision process to establish a Bluetooth mesh network; and
    a plurality of nodes, each configured to receive the provisioning activation infrared signal and subsequently generate a group key according to predetermined group number information that each of the nodes has, so as to perform communication according to the group key based on a Bluetooth mesh network communication protocol to establish the Bluetooth mesh network, wherein each of the nodes further comprises:
        a storage circuit configured to store a plurality of pre-stored keys; and
        a processing circuit configured to, after receiving the provisioning activation infrared signal, retrieve one of the pre-stored keys according to the predetermined group number information to generate the group key;
    wherein the nodes further comprise predetermined node number information, and the infrared control apparatus is further configured to generate an infrared control signal that comprises the predetermined group number information and the predetermined node number information, such that the nodes corresponding to the predetermined group number information and the predetermined node number information execute a corresponding command according to the infrared control signal.

2. The Bluetooth mesh network system of claim 1, wherein each of the nodes comprises:
    an infrared communication circuit configured to receive the provisioning activation infrared signal.

3. The Bluetooth mesh network system of claim 1, wherein each of the nodes is configured to generate an infrared status report signal that comprises the predetermined group number information and the predetermined node number information, such that the infrared control apparatus retrieves status information of the nodes from the infrared status report signal.

4. The Bluetooth mesh network system of claim 1, wherein the group key comprises a network communication key and an application program key.

5. The Bluetooth mesh network system of claim 1, wherein the infrared control apparatus is an infrared remote controller or a router equipped with infrared transmission function.

6. A Bluetooth mesh network system provision method having quick provisioning mechanism, the method comprising:
    generating a provisioning activation infrared signal used to activate a provision process to establish a Bluetooth mesh network by an infrared control apparatus;
    for each of a plurality of nodes, in which the nodes comprise predetermined node number information, receiving the provisioning activation infrared signal, subsequently retrieving one of a plurality of pre-stored keys stored by a storage circuit and retrieving one of the pre-stored keys according to predetermined group number information that each of the nodes has, to generating a group key by a processing circuit;
    performing communication according to the group key based on a Bluetooth mesh network communication protocol by the nodes to establish the Bluetooth mesh network;
    generating an infrared control signal that comprises the predetermined group number information and the predetermined node number information by the infrared control apparatus; and
    executing a corresponding command according to the infrared control signal by the nodes corresponding to the predetermined group number information and the predetermined node number information.

7. The Bluetooth mesh network system provision method of claim 6, further comprising:
    receiving the provisioning activation infrared signal by an infrared communication circuit of each of the nodes.

8. The Bluetooth mesh network system provision method of claim 6, further comprising:
    generating an infrared status report signal that comprises the predetermined group number information and the predetermined node number information by each of the nodes; and
    retrieving status information of the nodes from the infrared status report signal by the infrared control apparatus.

9. The Bluetooth mesh network system provision method of claim 6, wherein the group key comprises a network communication key and an application program key.

10. The Bluetooth mesh network system provision method of claim 6, wherein the infrared control apparatus is an infrared remote controller or a router equipped with infrared transmission function.

11. A Bluetooth mesh network system having quick provisioning mechanism, the system comprising:
   an infrared control apparatus configured to generate a provisioning activation infrared signal used to activate a provision process to establish a Bluetooth mesh network; and
   a plurality of nodes, each configured to receive the provisioning activation infrared signal and subsequently generate a group key according to predetermined group number information that each of the nodes has, so as to perform communication according to the group key based on a Bluetooth mesh network communication protocol to establish the Bluetooth mesh network, wherein each of the nodes further comprises:
      a storage circuit configured to store a predetermined calculation program; and
      a processing circuit configured to, after receiving the provisioning activation infrared signal, execute the predetermined calculation program to perform a predetermined calculation process according to the predetermined group number information to generate the group key;
   wherein the nodes further comprise predetermined node number information, and the infrared control apparatus is further configured to generate an infrared control signal that comprises the predetermined group number information and the predetermined node number information, such that the nodes corresponding to the predetermined group number information and the predetermined node number information execute a corresponding command according to the infrared control signal.

\* \* \* \* \*